United States Patent
Chacko et al.

(10) Patent No.: US 8,650,913 B2
(45) Date of Patent: Feb. 18, 2014

(54) THIN ROTARY-FIBERIZED GLASS INSULATION AND PROCESS FOR PRODUCING SAME

(75) Inventors: Jacob Chacko, Pickerington, OH (US); Robert P. Collier, Gahanna, OH (US); Edward A. Martine, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1041 days.

(21) Appl. No.: 12/627,303

(22) Filed: Nov. 30, 2009

(65) Prior Publication Data

US 2010/0147032 A1 Jun. 17, 2010

Related U.S. Application Data

(62) Division of application No. 11/179,174, filed on Jul. 12, 2005.

(51) Int. Cl.
*C03B 37/022* (2006.01)

(52) U.S. Cl.
USPC .......... 65/455; 65/438; 65/457; 65/459; 65/469; 65/470

(58) Field of Classification Search
USPC ............. 65/438, 455, 457, 459, 469, 470
See application file for complete search history.

(56) References Cited

U.S. PATENT DOCUMENTS

| | | | |
|---|---|---|---|
| 3,608,166 A | 9/1971 | Gruget | |
| 3,829,939 A | 8/1974 | Dilo | |
| 3,975,565 A | 8/1976 | Kendall | |
| 4,011,651 A * | 3/1977 | Bradbury et al. | ............... 29/424 |
| 4,099,641 A | 7/1978 | Schiedat | |
| 4,191,304 A | 3/1980 | Schiedat | |
| 4,237,180 A | 12/1980 | Jaskowski | |
| 4,418,031 A | 11/1983 | Doerer et al. | |
| 4,522,876 A | 6/1985 | Hiers | |

(Continued)

FOREIGN PATENT DOCUMENTS

| | | |
|---|---|---|
| CA | 2444552 | 9/2011 |
| CN | 1204280 | 11/1996 |

(Continued)

OTHER PUBLICATIONS

Office action from U.S. Appl. No. 11/179,174 dated Nov. 4, 2008.

(Continued)

*Primary Examiner* — Queenie Dehghan
(74) *Attorney, Agent, or Firm* — Calfee, Halter & Griswold LLP

(57) ABSTRACT

A method of forming a needled rotary fiberglass glass insulation product is provided. The formation of the needled insulation product may be conducted in a continuous in-line process in which the fibers are rotary formed, a binder is sprayed onto the hot fibers, the fibers are collected onto a conveyor and formed into a fiberglass pack, the fiberglass pack is passed through the oven, and the cured insulation blanket is passed through a needling apparatus. The reduction in thickness and increased density caused by the needling process permits the production of lower thickness and higher density insulation products. In particular, the needled insulation product may have a thickness of less than about 0.75 inches and a density from about 1 pcf to about 10 pcf. The needled insulation product may be utilized in household appliances, water heaters, and HVAC equipment.

18 Claims, 2 Drawing Sheets

(56) References Cited

U.S. PATENT DOCUMENTS

| | | | |
|---|---|---|---|
| 4,585,685 A | 4/1986 | Forry et al. | |
| 4,595,630 A | 6/1986 | Fay | |
| 4,751,134 A | 6/1988 | Chenoweth et al. | |
| 4,759,785 A | 7/1988 | Barthe et al. | |
| 4,844,049 A | 7/1989 | Nelson | |
| 4,847,140 A | 7/1989 | Jaskowski | |
| 4,878,482 A | 11/1989 | Pfeffer | |
| 4,888,235 A | 12/1989 | Chenoweth et al. | |
| 4,889,764 A | 12/1989 | Chenoweth et al. | |
| 4,923,547 A | 5/1990 | Yamaji et al. | |
| 4,940,042 A | 7/1990 | Moore et al. | |
| 4,946,738 A | 8/1990 | Chenoweth et al. | |
| 5,020,512 A | 6/1991 | Vago et al. | |
| 5,055,428 A | 10/1991 | Porter | |
| 5,100,450 A | 3/1992 | Cunningham | |
| 5,272,000 A | 12/1993 | Chenoweth et al. | |
| 5,318,990 A | 6/1994 | Straus | |
| 5,340,868 A | 8/1994 | Straus et al. | |
| 5,346,947 A * | 9/1994 | Guerro et al. | 524/591 |
| 5,523,264 A | 6/1996 | Mattson | |
| 5,661,213 A | 8/1997 | Arkens et al. | |
| 5,671,518 A | 9/1997 | Kummermehr et al. | |
| 5,674,307 A | 10/1997 | Huey et al. | |
| 5,688,301 A | 11/1997 | Brandon et al. | |
| 5,697,330 A | 12/1997 | Yetman | |
| 5,787,677 A | 8/1998 | Bolich et al. | |
| 5,837,621 A | 11/1998 | Kajander | |
| 5,840,413 A | 11/1998 | Kajander | |
| 5,871,830 A | 2/1999 | Miller | |
| 5,876,529 A * | 3/1999 | Grant et al. | 156/62.4 |
| 5,885,390 A | 3/1999 | Alkire et al. | |
| 5,906,669 A | 5/1999 | Tonder et al. | |
| 5,932,499 A | 8/1999 | Xu et al. | |
| 5,972,434 A | 10/1999 | Kajander | |
| 5,980,680 A | 11/1999 | Miller | |
| 5,983,586 A | 11/1999 | Berdan, II et al. | |
| 6,058,892 A | 5/2000 | Haak, II | |
| 6,077,795 A | 6/2000 | Blinkhorn et al. | |
| 6,227,009 B1 | 5/2001 | Cusick et al. | |
| 6,274,661 B1 | 8/2001 | Chen et al. | |
| 6,497,950 B1 | 12/2002 | Haile et al. | |
| 6,527,014 B1 | 3/2003 | Aubourg | |
| 6,564,437 B2 | 5/2003 | Meng et al. | |
| 6,596,048 B1 | 7/2003 | Tuffal et al. | |
| 6,669,265 B2 | 12/2003 | Tilton et al. | |
| 6,699,945 B1 | 3/2004 | Chen et al. | |
| 6,756,332 B2 | 6/2004 | Sandoe et al. | |
| 6,807,925 B1 | 10/2004 | Lesage | |
| 6,884,849 B2 | 4/2005 | Chen et al. | |
| 6,893,711 B2 | 5/2005 | Williamson et al. | |
| 6,941,899 B2 | 9/2005 | Bradenbaugh | |
| 7,013,841 B1 | 3/2006 | Boros et al. | |
| 7,128,561 B2 | 10/2006 | Rockwell et al. | |
| 7,268,092 B2 | 9/2007 | Gerard et al. | |
| 7,993,724 B2 | 8/2011 | Chacko | |
| 2002/0134322 A1 | 9/2002 | Dolan | |
| 2002/0137421 A1 | 9/2002 | Desroches et al. | |
| 2002/0160682 A1 | 10/2002 | Zeng et al. | |
| 2003/0165670 A1* | 9/2003 | Gerard et al. | 428/292.1 |
| 2003/0167789 A1 | 9/2003 | Tanimoto et al. | |
| 2004/0050619 A1 | 3/2004 | Bargo, II | |
| 2004/0091326 A1* | 5/2004 | Spittle | 405/302.7 |
| 2004/0161993 A1 | 8/2004 | Tripp et al. | |
| 2004/0176003 A1 | 9/2004 | Yang et al. | |
| 2005/0026527 A1 | 2/2005 | Schmidt et al. | |
| 2005/0031819 A1* | 2/2005 | Mankell et al. | 428/36.91 |
| 2005/0075030 A1 | 4/2005 | Coon et al. | |
| 2005/0079786 A1 | 4/2005 | Wilkins | |
| 2005/0082721 A1 | 4/2005 | Haque et al. | |
| 2005/0115662 A1 | 6/2005 | Haque et al. | |
| 2005/0191921 A1 | 9/2005 | Tilton et al. | |
| 2005/0266758 A1 | 12/2005 | Nishikori et al. | |
| 2006/0019568 A1* | 1/2006 | Toas et al. | 442/381 |
| 2006/0137799 A1 | 6/2006 | Haque et al. | |
| 2006/0141884 A1 | 6/2006 | Haque et al. | |
| 2006/0166582 A1 | 7/2006 | Turkson | |
| 2007/0014995 A1 | 1/2007 | Chacko | |
| 2008/0160857 A1 | 7/2008 | Chacko | |
| 2010/0151223 A1 | 6/2010 | Chacko | |

FOREIGN PATENT DOCUMENTS

| | | |
|---|---|---|
| CN | 1515722 | 7/2004 |
| CN | 1619038 | 5/2005 |
| FR | 2337703 | 8/1977 |
| JP | 06-116854 | 4/1994 |
| KR | 078 123 | 10/2003 |
| KR | 028 443 | 4/2004 |
| WO | 97/24211 | 7/1997 |
| WO | 2007/008412 | 1/2007 |

OTHER PUBLICATIONS

Office action from U.S. Appl. No. 11/179,174 dated Mar. 20, 2009.
Advisory action from U.S. Appl. No. 11/179,174 dated Jul. 7, 2009.
Panel Decision from U.S. Appl. No. 11/179,174 dated Sep. 8, 2009.
Examiner's Answer from U.S. Appl. No. 11/179,174 dated Mar. 30, 2011.
Office action from U.S. Appl. No. 11/179,174 dated Jul. 20, 2011.
Office action from U.S. Appl. No. 11/179,174 dated Nov. 3, 2011.
Advisory action from U.S. Appl. No. 11/179,174 dated Feb. 7, 2012.
Office action from U.S. Appl. No. 11/801,247 dated Dec. 29, 2009.
Office action from U.S. Appl. No. 11/801,247 dated Jul. 9, 2010.
Notice of allowance from U.S. Appl. No. 11/801,247 dated Dec. 22, 2010.
Notice of allowance from U.S. Appl. No. 11/801,247 dated Apr. 4, 2011.
Office action from U.S. Appl. No. 12/002,649 dated Mar. 2, 2010.
Office action U.S. Appl. No. 12/002,649 dated Jun. 8, 2010.
Office action from U.S. Appl. No. 12/002,649 dated Mar. 15, 2011.
Office action from U.S. Appl. No. 12/002,649 dated Sep. 2, 2011.
Advisory Action from U.S. Appl. No. 12/002,649 dated Nov. 9, 2011.
Interview Summary from U.S. Appl. No. 12/002,649 dated Dec. 5, 2011.
Office action from U.S. Appl. No. 11/179,174 dated Dec. 20, 2012.
Office action from Chinese Application No. 200680025329.7 dated Mar. 7, 2012.
Office action from U.S. Appl. No. 12/002,649 dated Apr. 26, 2012.
International Search Report PCT/US2006/025071 dated Dec. 20, 2006.
International Preliminary Report on Patentability from International Application No. PCT/US2006/025071, dated Dec. 12, 2007.
Written Opinion of the International Searching Authority from International Application No. PCT/US025071, Jan. 12, 2008.
Office Action from Chinese Patent Application No. 200680025329.7, dated Sep. 20, 2010.
Office action from Canadian Application No. 2,613,967 dated Apr. 25, 2012.
Office action from Chinese Application No. 200680025329.7 dated Nov. 5, 2012.
Office action from European Application No. 06785695.5 dated Oct. 29, 2012.
Office action from Mexican Application No. 08/00476 dated Oct. 10, 2012 along with English translation of relevant portions of action.
Office action from Korean Application No. 2008-7000968 dated Jan. 28, 2013.
Office action from Canadian Application No. 2,613,967 dated Jan. 22, 2013.
Office action from U.S. Appl. No. 12/002,649 dated Dec. 4, 2012.
Office action from U.S. Appl. No. 12/627,252 dated Aug. 28, 2013.
ToolingU, Basics of the Bonding Process, accessed Aug. 12, 2013, http://www.goolingu.com/definition-670120-41246-mechanical-bonding.html.
Homeowner's Guide to Insulating Ideas for Comfort and Energy Savings, accessed Aug. 13, 2013, http://insulation.owenscorning.com/docs/10001528-B%20RF.pdf.
Beroes, Charles S. The Dangerous Flammable Fabrics: Burning Ourselves, Our Children and Our Senior Citizens, Bloomington, IN, Authorhouse, 2004.
Office action from Canadian Application No. 2,613,967 dated Oct. 9, 2013.
Office action from U.S. Appl. No. 11/179,174 dated Dec. 5, 2013.

* cited by examiner

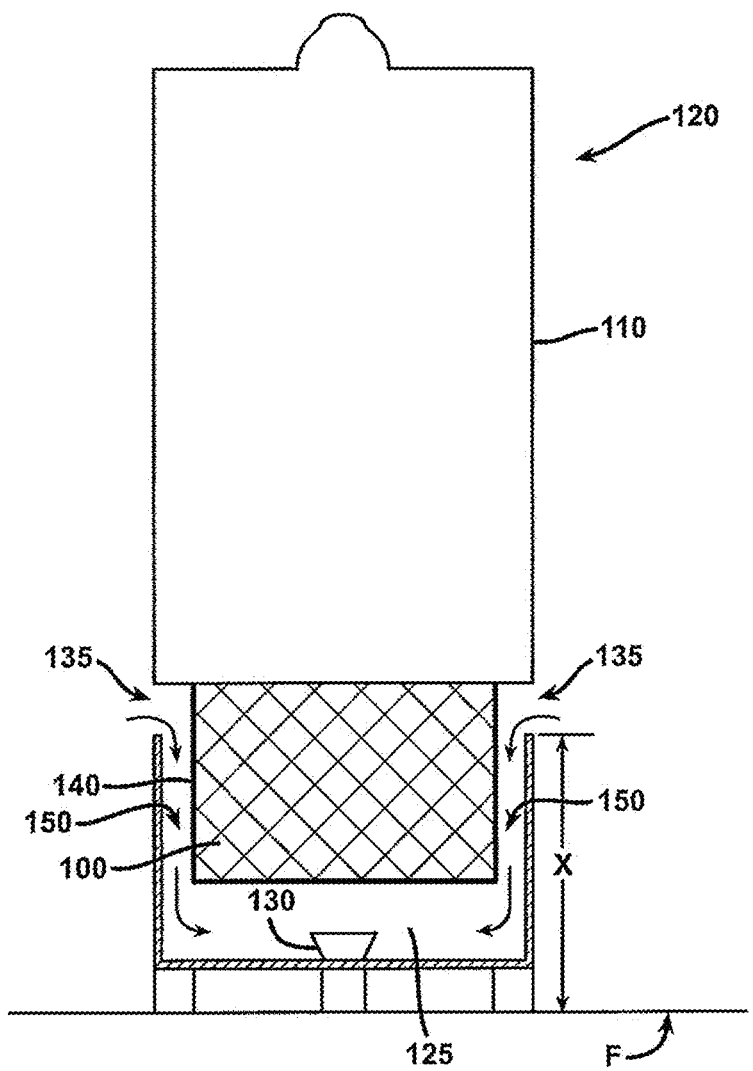

THIN ROTARY-FIBERIZED GLASS INSULATION AND PROCESS FOR PRODUCING SAME

CROSS REFERENCE TO RELATED APPLICATIONS

The application is a divisional of U.S. patent application Ser. No. 11/179,174 entitled "This Rotary-Fiberized Glass Insulation And Process For Producing Same" filed Jul. 12, 2005, the entire content of which is expressly incorporated herein by reference.

TECHNICAL FIELD AND INDUSTRIAL APPLICABILITY OF THE INVENTION

The present invention relates generally to rotary fiberglass insulation and more particularly to a needled, bindered rotary-fiberized glass insulation product that has a reduced thickness.

BACKGROUND OF THE INVENTION

Conventional fibers are useful in a variety of applications including reinforcements, textiles, and acoustical and thermal insulation materials. The fibers can be formed from molten organic materials such as polymers or inorganic materials such as glass. Short, straight fibers typical of conventional thermal and acoustical insulation materials are made by rotary fiberizing techniques and are interconnected by binders. In such techniques, a molten glass material is delivered to a spinner. Fibers produced by the rotating spinner are drawn downwardly towards a conveyor by a blower. As the fibers move downward, binder is sprayed onto the fibers and the fibers are collected into a high loft, continuous blanket on the conveyor. The blanket is passed through a curing oven and the binder is cured to set the blanket to a desired thickness. Because of its combination of thermal, acoustical, and mechanical properties and low cost, rotary fiberglass is the preferred insulation for many applications, including HVAC equipment, water heaters, ranges, and other household appliances where the required thickness is greater than one inch.

In most conventional gas-fired water heaters, the air intake for the combustion chamber and the combustion chamber containing the burner to heat the water tank are located at or near floor level. However, in some circumstances, flammable liquids such as gasoline, kerosene, organic solvent based paint and cleaning supplies may be located near the gas water heater. Vapors from these combustible liquids may accumulate on the floor of the room and some vapors may be drawn into the combustion chamber and ignited by the pilot flame or the flame within the combustion chamber, causing a backflash. The flames could spread outwardly from the water heater and ignite any flammable material within its path. As a result of the occurrences of water heater fires, many safety standards require that the air flow intakes of gas water heaters be located about 18 inches or more above the floor to reduce or prevent the intake of combustible vapors into the combustion chamber.

Specific examples of attempts to raise the air flow intakes above the ground are set forth below.

U.S. Pat. No. 4,940,042 Moore, Jr. et al., which discloses a direct venting system for an indoor water heater that vents the combustion chamber of the water heater directly with the outdoor atmosphere. A conduit assembly extends from an indoor end attached to the water heater (such as to the top) to an outdoor end in communication with the outside atmosphere. The conduit assembly is external to the water heater. The conduit provides continuous combustion air inlet and flue gas outlet plenums to isolate the combustion chamber of the water heater from the indoor room air.

U.S. Pat. No. 5,697,330 to Yetman et al., which. describes a power-vented water heater that includes a draft inducer fan attached to the top end of the storage tank of the water heater via a molded plastic adapter. The molded external plastic adapter has an inlet to receive hot gas from the combustion chamber and cooling external air and an outlet for discharging the received gas. A combustion gas discharge pipe is connected to the fan outlet, and an air intake pipe that has a first portion connected to the outlet leg of the adapter to deliver combustion gas and a second portion coupled to the burner inlet to deliver combustion air along with gaseous fuel.

U.S. Pat. No. 6,058,892 to Haak, II, which describes an air flow control and routing apparatus for attaching to a gas water heater to restrict entry of floor-level gases into the water heater. The air flow control apparatus includes an skirt for surrounding the base of the water heater and an external air intake tube attached to the skirt for transporting inlet air to the combustion chamber. The air intake tube is preferably located at least three feet from the floor, or halfway up the water heater.

U.S. Patent Publication No. 2002/0134322 to Dolan, which describes a safety device for preventing the ignition of flammable vapors by the open flames within a gas fired water heater. In one embodiment of the invention, the combustion chamber is enclosed in a barrier skirt and an external "snorkel" is attached to the side of the water heater such that the air intake is above the floor. The snorkel is preferably 18 inches in length.

Although such prior art systems each have a device or apparatus for moving the air intake above the ground, the systems require additional equipment, such as pipes, fans, adapters, and the like, that are positioned external to the water heater. Not only does such equipment raise the overall cost of the water heater, but it also creates a water heater that requires a larger amount of storage space.

In certain applications, a thinner insulation product is desired or required. In these particular applications, rotary formed fiberglass is typically not used because without expensive modifications to the rotary fiberizing manufacturing line, the rotary fiberglass insulation blanket cannot be controlled to a thickness below one inch. In order to produce an insulation product less than about one inch, and especially less than about ½ inch thick, a more expensive insulation such as flame attenuated or needled E-glass insulation is typically used.

Needle punching, or "needling", is a method commonly used to bond non-woven, carded, or air-laid blankets without the use of chemical binders. In the needle punching process, barbed needles are passed in and out of the blankets to entangle the fibers. However, needling a carded or air-laid blanket of rotary glass fibers is difficult because the carding or air-laid process breaks the fibers into short lengths that are insufficient for mechanical bonding. As a result, a second type of fiber, such as E-glass, polyester, nylon, or aramid, is conventionally added to the rotary glass fibers. These additional fibers add significant cost to the final product as the second fiber is more expensive than the rotary glass fibers.

Thus, there exists a need in the art for a thin rotary fiberglass insulation product that is inexpensive to manufacture, that can be formed using existing manufacturing lines, and that may be used in applications where a thin insulation is desired.

SUMMARY OF THE INVENTION

It is an object of the present invention to provide a needled rotary fiberglass insulation product that has a reduced thickness. The insulation product is formed of single component rotary glass fibers at least partially coated with a binder. Suitable binders include a phenol-formaldehyde binder, a urea-formaldehyde binder, a polycarboxylic based binder, a polyacrylic acid glycerol (PAG) binder, or a polyacrylic acid triethanolamine (PAT binder). Preferably, the binder is desirably a low formaldehyde or formaldehyde-free binder composition. The glass fibers may have a diameter from about 2 to about 9 microns and a length of from about ¼ of an inch to about 4 inches. The small diameter of the glass fibers and the needling of the insulation as described below help give the final insulation product a soft feel and flexibility. In addition, the needled insulation product may have a compressed overall average thickness of about 0.1 inch to about 0.75 inch, preferably from about 0.25 to about 0.50 inches, and a density of from about 1 pcf to about 10 pcf, preferably from about 3 to about 5 pcf. The thin, needled rotary fiberized insulation product is useful in a variety of thermal and acoustical applications, such as appliance insulation, HVAC equipment, water heaters, and acoustical panels.

It is another object of the invention to provide a method of forming a needled rotary fiber insulation product that has a thickness of about 0.75 inches or less, preferably less than about 0.5 inches. The insulation product may be formed in a continuous in-line process in which single component rotary glass fibers are formed, a binder is sprayed onto the hot fibers, and the binder coated fibers are collected onto a conveyor and formed into an insulation pack. The insulation pack is then passed through a curing oven to cure the binder and form an insulation blanket. To reduce the thickness of the insulation blanket and increase the density, the insulation blanket is passed through a needling apparatus. The thickness and density of the final insulation product may be controlled by controlling how fast the insulation blanket moves through the needling apparatus, the strokes per minute of the needling apparatus, the number and types of needles used, and/or the degree of penetration of the needles into the insulation blanket. The needled, thin fiberglass insulation product may be rolled onto a creel by a roll-up device for shipping or for storage for use at a later time. Alternatively, the needled insulation product may be fed directly into a die press, cut into individual parts having a predetermined size and/or shape, and packaged.

Another object of the present invention is to provide a water heater that utilizes the rotary glass fiber insulation product of the instant invention. The water heater contains air flow intakes that penetrate the outer walls of the water heater to permit air external to the water heater into the water heater and into the combustion chamber. An air flow passageway is positioned along the outer edge of the water heater between the outer wall of the water heater and the rotary glass insulation product of the present invention. The reduced thickness provided by the rotary glass insulation product enables the formation of the airflow passageways in the hot water heater. The air flow passageways connect the air intakes and the combustion chamber so that oxygen is provided to ignite the burner. In preferred embodiments, the air flow intakes are located about 18 inches or more above the floor. The air flow intakes may be flush with the outer walls of the water heater or they may jut outwards from the outer walls of the water heater. A barrier layer may optionally be positioned on the needled insulation product to act as a fire retardant. The barrier layer may be formed of foil or another suitable fire retardant material and may be affixed by conventional methods known by those of skill in the art.

It is an advantage that the needled insulation product is flexible due to the combination of chemical bonding from the binder and mechanical bonding from the needling process.

It is also an advantage of the invention that the thin insulation products made in accordance with the present invention can be manufactured using current manufacturing lines, thereby saving time and money.

It is another advantage of the invention that by needling the glass fiber insulation product a softer feel is provided.

It is a further advantage of the present invention that the needled insulation product has a low k value that is equivalent to or less than conventional thick rotary fiberized glass insulation blankets.

It is also an advantage of the present invention that the needled insulation product is easy to work due with to its reduced thickness and flexibility.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial cross-section of a water heater utilizing a needled rotary fiberglass insulation product in accordance with at least one other exemplary embodiment of the present invention.

DETAILED DESCRIPTION AND PREFERRED EMBODIMENTS OF THE INVENTION

Figure 1:
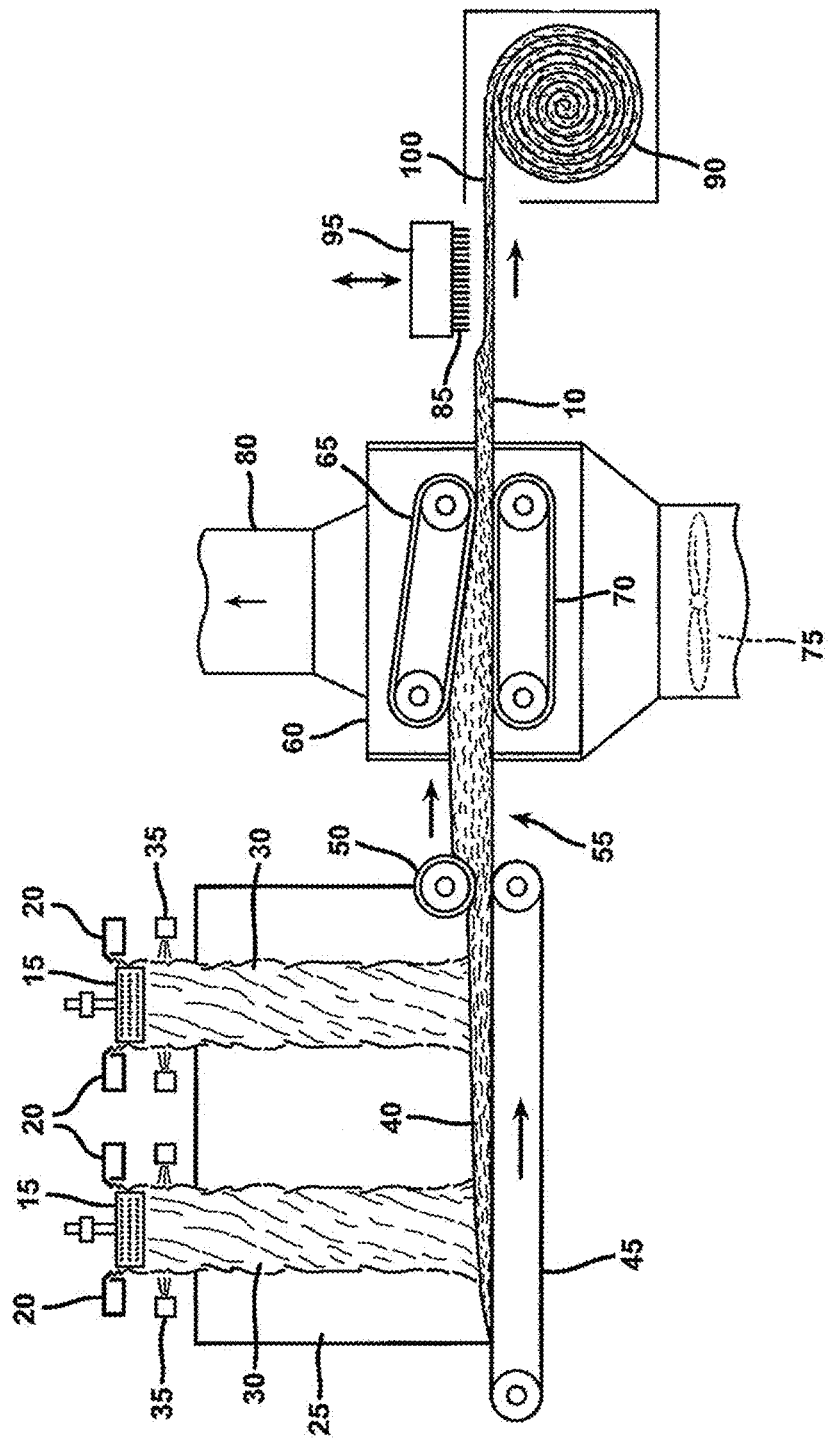
FIG. 1 is an elevational view of a manufacturing line for producing a needled rotary fiberglass insulation product according to at least one exemplary embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. It is to be noted that the phrase "binder composition" and "binder" may be used interchangeably herein.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. It is to be noted that like numbers found throughout the figures denote like elements.

The present invention relates to rotary fiber insulation products that have a reduced thickness, preferably a thickness of about 0.75 inches or less, and a method of forming such rotary fiber insulation products. The thin fiberglass insulation is produced by needling a thick, lofty insulation product to increase the density and reduce the thickness of the insulation. The thin insulation product is useful in a variety of thermal and acoustical applications, such as, appliance insulation, HVAC equipment, water heaters, and acoustical panels.

The manufacture of the thin fibrous insulation product according to the present invention may be carried out in a continuous process by fiberizing molten glass, spraying binder onto the fibers, forming a single component fibrous glass insulation pack on a moving conveyor, curing the binder on the fibrous glass insulation pack to form an insulation blanket, and needling the insulation blanket. Turning to FIG. 1, glass may be melted in a tank (not shown) and supplied to a fiber forming device such as a fiberizing spinner 15. The spinners 15 are rotated at high speeds. Centrifugal force causes the molten glass to pass through the holes in the circumferential sidewalls of the fiberizing spinners 15 to form glass fibers. Single component glass fibers of random lengths may be attenuated from the fiberizing spinners 15 and blown generally downwardly, that is, generally perpendicular to the plane of the spinners 15, by blowers 20 positioned within a forming chamber 25. Examples of glass fibers that may be utilized in the present invention are described in U.S. Pat. No. 6,527,014 to Aubourg; U.S. Pat. No. 5,932,499 to Xu et al.; U.S. Pat. No. 5,523,264 to Mattison; and U.S. Pat. No. 5,055,428 to Porter, the contents of which are incorporated by reference in their entirety.

The blowers 20 turn the fibers downward to form a veil or curtain 30. The glass fibers may have a diameter from about 2 to about 9 microns and may have a length of from about ¼ of an inch to about 4 inches. Preferably, the glass fibers have a diameter of from about 3 to about 6 microns and a length of from about ½ of an inch to about 1½ inches. The small diameter of the glass fibers and the needling of the insulation as described below helps give the final insulation product a soft feel and flexibility.

The glass fibers, while in transit in the forming chamber 25 and while still hot from the drawing operation, are sprayed with an aqueous binder composition by suitable spray applicators 35 so as to result in a distribution of the binder composition throughout the formed insulation pack 40. Water may also be applied to the glass fibers in the forming chamber 25, such as by spraying, prior to the application of the binder composition to at least partially cool the glass fibers. Although any conventional binder such as phenol-formaldehyde and urea-formaldehyde may be used, the binder is desirably a low formaldehyde binder composition, such as a polycarboxylic based binder, a polyacrylic acid glycerol (PAG) binder, or a polyacrylic acid triethanolamine (PAT binder). Suitable polycarboxy binder compositions for use in the instant invention include a polycarboxy polymer, a crosslinking agent, and, optionally, a catalyst. Such binders are known for use in connection with rotary fiberglass insulation. Examples of such binder technology are found in U.S. Pat. No. 5,318,990 to Straus; U.S. Pat. No. 5,340,868 to Straus et al.; U.S. Pat. No. 5,661,213 to Arkens et al.; U.S. Pat. No. 6,274,661 to Chen et al.; U.S. Pat. No. 6,699,945 to Chen et al.; and U.S. Pat. No. 6,884,849 to Chen et al., each of which is expressly incorporated entirely by reference. The binder may be present in an amount of from less than or equal to about 10% by weight, and preferably in an amount less than or equal to about 3% by weight of the total product. The low amount of binder contributes to the flexibility of the final insulation product.

The glass fibers having the uncured resinous binder adhered thereto may be gathered and formed into an uncured insulation pack 40 on an endless forming conveyor 45 within the forming chamber 25 with the aid of a vacuum (not shown) drawn through the insulation pack 40 from below the forming conveyor 45. The residual heat from the glass fibers and the flow of air through the insulation pack 40 during the forming operation are generally sufficient to volatilize a majority of the water from the binder before the glass fibers exit the forming chamber 25, thereby leaving the remaining components of the binder on the fibers as a viscous or semi-viscous high-solids liquid.

The coated insulation pack 40, which is in a compressed state due to the flow of air through the pack 40 in the forming chamber 25, is then transferred out of the forming chamber 25 under exit roller 50 to a transfer zone 55 where the insulation pack 40 vertically expands due to the resiliency of the glass fibers. The expanded insulation pack 40 is then heated, such as by conveying the pack 40 through a curing oven 60 where heated air is blown through the insulation pack 40 to evaporate any remaining water in the binder, cure the binder, and rigidly bond the fibers together. Heated air is forced though a fan 75 through the lower oven conveyor 70, the insulation pack 40, the upper oven conveyor 65, and out of the curing oven 60 through an exhaust apparatus 80. The cured binder imparts strength and resiliency to the insulation blanket 10. It is to be appreciated that the drying and curing of the binder may be carried out in either one or two different steps. The two stage process is commonly known as B-staging.

Also, in the curing oven 60, the insulation pack 40 may be compressed by upper and lower foraminous oven conveyors 65, 70 to form a fibrous insulation blanket 10. It is to be appreciated that the insulation blanket 10 has an upper surface and a lower surface. The upper and lower oven conveyors 65, 70 may be used to compress the insulation pack 40 to give the insulation blanket 10 a predetermined thickness. The curing oven 60 may be operated at a temperature from about 200° C. to about 325° C. Preferably, the temperature of the curing oven ranges from about 250° C. to about 300° C. The insulation pack 40 may remain within the oven for a period of time sufficient to crosslink (cure) the binder and form the insulation blanket 10. In particular, the insulation pack 40 may remain in the oven 60 for about 30 seconds to about 3 minutes, and preferably for about 45 seconds to about 1½ minutes to cure the binder. The insulation blanket 10 exiting the curing oven 60 may have a density of from about 0.3 pcf to about 4.0 pcf and a thickness from about 1 to about 12 inches.

After the binder is cured, the insulation blanket 10 is subjected to a needling process in which barbed needles 85 are pushed in a downward and upward motion through the fibers of the insulation blanket 10 to entangle or intertwine the fibers and impart mechanical strength and integrity to the insulation blanket 10. Needling the insulation blanket 10 also increases the density and reduces the overall thickness of the blanket 10. The needling process or needle punching may take place with or without precursor step of lubricating. In addition, the needling process may occur in a needling apparatus 95. A needling apparatus 95 such as may be utilized in the instant invention may include a web feeding mechanism, a needle beam with a needleboard, needles, such as, for example, ranging in number from about 500 per meter to about 10,000 per meter of machine width, a stripper plate, a bed plate, and a take-up mechanism. Rollers may also be provided to move the insulation blanket 10 through the needling apparatus 95 during the needling process and/or to compress the lofted insulation blanket 10 prior to the blanket 10 entering the needling apparatus 95.

The needles 85 are typically secured within the needling apparatus 95 to a vertically reciprocating needle board. Each of the needles may include one or more downwardly or upwardly pointing barbs. Alternatively, the needles 85 may have a forked tip. Other configurations of needles 85 that would grab and entangle the fibers are also considered to be within the purview of the invention. Depending on the configuration of the barbs on the needles 85, the fibers may become entangled on either the upward or downward stroke of the needles 85. For example, the barbs or forks on the needles 85 may capture and push individual fibers as the needles 85 move in the downward stroke, thereby entangling the individual fibers with adjacent fibers. As the needles 85 move upwardly out of the insulation blanket 10, the fibers slip off the barbs and remain entangled in the collection of fibers forming the needled insulation product 100. It is to be appreciated that the insulation blanket 10 may be needled from one or both sides, for example, on its upper surface, on its lower surface, or on both surfaces.

Prior to needling, the majority of the fibers in the insulation blanket 10 are oriented in a generally horizontal orientation. After needling, some of the horizontally oriented fibers are placed in a generally vertical orientation. This change in fiber orientation mechanically bonds the fibers and gives the needled insulation product 100 rigidity and stiffness. In addition, the needling process and mechanical bonding of the fibers allows for improved control over the thickness of the needled insulation product 100. Controlling the thickness of the insulation product 100 may facilitate the installation of the final insulation product 100 into its desired application. For example, by needling the insulation blanket 10 to a desired thickness, there may be no need to physically compress the needled insulation product 100 during its installation because it already has the desired thickness for the space or area in which it is to be installed.

The needles 85 may be pushed in and out of the insulation blanket at about 100 to about 1500 strokes per minute. The needles 85 may have a gauge (size) in the range of from about 9 to about 43 gauge and may range in length from about 3 to about 4 inches. The needling apparatus 95 may include needles having the same size, or, alternatively, a combination of different sized needles may be included. The punch density is preferably about 5 to about 100 punches per square centimeter. The punching depth or degree of penetration of the needles 85 through the insulation blanket 10 and into the bedplate of the needling apparatus 95 is preferably from about 0.25 to about 0.75 inches when needling from one side.

After passage throughout the needling apparatus 95, the needled insulation product 100 may be rolled by a roll-up device 90 for shipping or for storage for use at a later time, as depicted in FIG. 1. Thus, the formation of the needled insulation product 100 may be conducted in a continuous in-line process in which the fibers are formed, binder is sprayed onto the hot fibers, the fibers are collected onto a conveyor and formed into an insulation pack, the insulation pack is passed through the oven to cure the binder and form an insulation blanket, and the insulation blanket is passed through the needling apparatus and rolled onto a creel as described in detail above. Alternatively, the needling insulation product may be fed directly into a die press and cut into individual parts, which may then be packaged.

Although the needling of the insulation blanket is highly suitable for in-line manufacturing processes, needling of the insulation blanket may also occur in an off-line process in which the cured insulation blanket is packaged, such as in rolls, for either shipping or storage. The rolled insulation blanket (not shown in the figures) may then be taken separately to a needling apparatus for needling as described above. Preferably, needling is conducted in-line.

The needled insulation product 100 may have a compressed overall average thickness of about 0.1 inch to about 0.75 inch, preferably from about 0.25 to about 0.50 inches, and a density of from about 1 pcf to about 10 pcf, preferably from about 3 to about 5 pcf. The thickness and density of the final insulation product 100 may be controlled by controlling how fast the insulation blanket 10 moves through the needling apparatus 95, the strokes per minute of the needling apparatus 95, the number of needles 85, the type of needles 85, and the degree of penetration of the needles 85 into the insulation blanket 10. The reduction in thickness and increased density caused by the needling process permits the production of lower thickness and higher density final insulation products 100.

Needling also assists in providing a softer feel to the final insulation product 100. One particular advantage brought about by needling the insulation blanket 10 is that needling the insulation blanket 10 allows for the production of a final insulation product 100 that has a decreased thickness and a higher density (such as over about 3 pcf). Moreover, needling higher loft, lower density insulation blankets 10 to densify the blanket 10 using mechanical bonding according to at least one aspect of the instant invention is less expensive to manufacture than forming a higher density, thin, rotary-fiberized insulation product without needling, which requires costly equipment. It is also less expensive than competing needled E-glass and flame attenuated insulation products. Thus, thin insulation products 100 made in accordance with the present invention can be manufactured using current manufacturing lines, thereby saving time and money. Further, the needle punched rotary process of the present invention permits the production of products with a wider range of densities than that which is currently available with needled E-glass insulation.

The needled insulation product 100 may be used as an insulative material in household appliances and various other acoustical applications. For instance, the needled insulation product 100 may be used in household appliances (such as ovens, ranges, and microwave ovens), hot water heaters, dishwashers, HVAC equipment, and acoustical panels. One particularly advantageous use for the thin insulation material 100 is as insulation for hot water heaters. The thin insulation product 100 may be used to provide an internal air intake chamber and raise the air intake above the ground. Such internal air passageways eliminates the need for the external piping and other equipment required by the prior art.

An exemplary embodiment utilizing the needled insulation product 100 in a hot water heater 120 is illustrated in partial cross-section in FIG. 2. FIG. 2 depicts air flow intakes 135 penetrating the outer wall 110. The air flow intakes 135 are in fluid communication with the air flow passageways 150, which, in turn, are in fluid communication with the combustion chamber 125. The air flow intakes are located a distance "X" from the floor (F). It is to be appreciated that although FIG. 2 depicts two air flow passageways 150, one air flow passageway or more than two airflow passageways are also considered to be within the purview of this invention. The airflow passageways 150 are positioned along the outer edge of the water heater 120 between the outer wall 110 of the water heater 120 and the needled insulation product 100 to provide the oxygen needed to ignite the burner 130 positioned in the combustion chamber 125 and produce a flame to heat the water stored in the internal water tank (not shown in FIG. 2). In preferred embodiments, the air flow intakes 135 are located 18 inches or more above the floor (F) to be in compliance with current safety standards as discussed above. Air flow intakes 135 may be flush with the outer wall 110 of the water heater as depicted in FIG. 2, or, alternatively, they may jut outwards from the outer walls of the water heater 120 (not shown), such as in the form of a tube or pipe. A barrier layer 140 may optionally be positioned on the needled insulation product 100 to act as a fire retardant. The barrier layer 140 may be formed of foil or another suitable fire retardant material and may be affixed by conventional methods known by those of skill in the art.

The needled insulation product 100 enables the formation of the airflow passageways 150 in the hot water heater 120 due to the reduced thickness provided by the insulation product 100. Also, the needled insulation product 100 is easier to work with than conventional lofty insulation due to its reduced thickness and flexibility. Further, the needled insulation product 100 is less expensive to produce than conventional alternative insulative materials. In addition, the thin insulation product 100 has a low thermal conductivity (k value) that is equivalent to or less than the thick insulation blankets currently used in home appliances. As a result, the insulative properties of the needled insulation product 100 are equivalent to, or better than, current lofty insulation.

Having generally described this invention, a further understanding can be obtained by reference to certain specific examples illustrated below which are provided for purposes of illustration only and are not intended to be all inclusive or limiting unless otherwise specified.

EXAMPLE

Needled Rotary Glass Fiber Insulation

Single component glass was melted and rotary-fiberized in a unit with multiple spinners. The hot fibers were sprayed with a polyacrylic acid glycerol (PAG) binder, the fibers were collected on a conveyor, and formed into an insulation pack. The insulation pack was then passed through a curing oven for a sufficient amount of time and at a sufficient temperature to cure the binder and form an insulation blanket. The average fiber diameter was 5.9 microns, the PAG binder content was 1.64% by weight of the total insulation blanket, the average density of the insulation blanket was 1.01 lb/cu ft, and the average thickness of the insulation blanket was 1.1 inches. The nominal thermal conductivity (k-value) at 300° F. was determined to be 0.51 Btu-in/hr-sq ft-F.

The insulation blanket was then needled to increase the average density and reduce the average thickness. A single-sided needling apparatus with 36 gauge needles was used. The line speed was set at 30 ft/min, the punch frequency was 600 strokes/min, the punch density was 14.4 punches/sq cm, and the punch depth was 0.25 inches into the bedplate. The final average density of the needled insulation blanket (needled insulation product) was determined to be 3.12 lb/cu ft, the final average thickness was 0.33 inches, and the thermal conductivity (k-value) at 300° F. was 0.34 Btu-in/hr-sq ft-F.

The needled insulation blanket (needled insulation product) was faced with an aluminum foil/fiberglass scrim facing. Water heater insulation parts were then die-cut from the faced, needled insulation product.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming a needled rotary glass insulation product comprising the steps of:
    rotary-fiberizing glass to form glass fibers;
    applying a binder to at least a portion of said glass fibers;
    collecting said at least partially coated glass fibers to form an insulation pack;
    passing said insulation pack through an oven to at least partially cure said binder on said glass fibers and form an insulation blanket; and
    needling said insulation blanket after said curing to a thickness of about 0.1 inch to about 0.75 inch to form said needled rotary glass insulation product.

2. The method of claim 1, further comprising the step of:
    blowing said glass fibers downward to form a veil of said fibers prior to applying said binder to said glass fibers.

3. The method of claim 1, wherein said needling step comprises:
    pushing needles in a downward and upward motion through said insulation blanket to entangle said glass fibers and impart mechanical strength and integrity to said insulation blanket.

4. The method of claim 1, further comprising the step of:
    compressing said fiberglass pack in said oven between upper and lower compression rollers prior to needling said insulation blanket.

5. The method of claim 4, further comprising the step of:
    rolling said needled rotary glass insulation product onto a reel for shipping or storage.

6. The method of claim 4, further comprising the steps of:
    cutting said needled insulation product into a predetermined shape; and packaging said cut insulation product for shipping or storage.

7. The method of claim 1 wherein said thickness is from about 0.25 inches to about 0.5 inches.

8. The method of claim 1, wherein said needled rotary glass insulation product has a density from about 1 pcf to about 10 pcf.

9. The method of claim 8, wherein said needled rotary glass insulation product has a density from about 3 pcf to about 5 pcf.

10. The method of claim 8, further comprising positioning a fire-retarding barrier layer on said needled rotary glass insulation product.

11. The method of claim 8, wherein said glass fibers have a diameter from about 2 to about 9 microns and a length from about 0.25 to about 4 inches.

12. The method of claim 1, wherein said binder is at least one member selected from the group consisting of a polycarboxylic based binder, a polyacrylic acid glycerol binder and a polyacrylic acid triethanolamine binder.

13. The method of claim 12, wherein said binder is present on said rotary glass fibers in an amount less than or equal to 3% by weight of said needled rotary glass insulation product.

14. A method of forming a fire-retardant, needled rotary glass insulation product comprising the steps of:
    rotary-fiberizing glass to form glass fibers;
    applying a binder to at least a portion of said glass fibers;
    collecting said at least partially coated glass fibers to form an insulation pack;
    passing said insulation pack through an oven to at least partially cure said binder on said glass fibers and form an insulation blanket;

needling said insulation blanket after said curing to a thickness of about 0.1 inch to about 0.75 inch to form said needled rotary glass insulation product; and positioning a fire-retarding barrier layer on said needled rotary glass insulation product.

15. The method of claim 14, wherein said thickness is from about 0.25 inches to about 0.5 inches.

16. The method of claim 14, wherein said needled rotary glass insulation product has a density from about 1 pcf to about 10 pcf.

17. The method of claim 14, wherein said glass fibers have a diameter from about 2 to about 9 microns and a length from about 0.25 to about 4 inches.

18. The method of claim 14, wherein said binder is at least one member selected from the group consisting of a polycarboxylic based binder, a polyacrylic acid glycerol binder and a polyacrylic acid triethanolamine binder.

* * * * *